United States Patent [19]
Yu et al.

[11] Patent Number: 5,808,967
[45] Date of Patent: Sep. 15, 1998

[54] TWO-DIMENSIONAL ARRAY TRANSDUCER AND BEAMFORMER

[75] Inventors: Xiaolong Yu; Steven E. Bradley; Francis D. Rowe, all of San Diego, Calif.

[73] Assignee: Rowe-Deines Instruments Incorporated, San Diego, Calif.

[21] Appl. No.: 726,644

[22] Filed: Oct. 7, 1996

[51] Int. Cl.⁶ .................................................. G01S 15/60
[52] U.S. Cl. ............................................. 367/91; 367/137
[58] Field of Search .................................. 367/138, 7, 89, 367/90, 91, 103, 119, 121, 153

[56] References Cited

U.S. PATENT DOCUMENTS

| | | |
|---|---|---|
| 3,324,453 | 6/1967 | Brightman . |
| 3,346,837 | 10/1967 | Pommerening . |
| 3,436,721 | 4/1969 | Farr . |
| 3,603,920 | 9/1971 | Stedtnitz ............................ 367/91 |
| 3,704,465 | 11/1972 | Masak et al. . |
| 3,806,930 | 4/1974 | Gobert . |
| 4,121,209 | 10/1978 | ap Rhys . |
| 4,208,916 | 6/1980 | Thomenius et al. . |
| 4,241,610 | 12/1980 | Anderson . |
| 4,265,126 | 5/1981 | Papadofrangakis et al. . |
| 4,340,892 | 7/1982 | Brunner et al. . |
| 4,413,332 | 11/1983 | Gilmour . |
| 4,423,494 | 12/1983 | Groves et al. . |
| 4,532,519 | 7/1985 | Rudish et al. . |
| 4,550,607 | 11/1985 | Maslak et al. . |
| 4,641,291 | 2/1987 | Simmons, Sr. et al. . |
| 4,661,937 | 4/1987 | Groves . |
| 4,882,588 | 11/1989 | Renshaw et al. . |
| 5,208,785 | 5/1993 | Brumley et al. . |
| 5,343,443 | 8/1994 | Merewether . |
| 5,694,372 | 12/1997 | Perennes .................................. 367/91 |

*Primary Examiner*—Daniel T. Pihulic
*Attorney, Agent, or Firm*—Knobbe, Martens, Olson & Bear LLP

[57] ABSTRACT

An acoustic array transducer capable of forming narrow dispersion, broadband or narrowband acoustic beam sets in two dimensions with a minimum aperture size. Concurrent yet independent electrical interfacing with array transducer elements allows simultaneous formation of multiple transmit and receive beams inclined within two planar orientations normal to the array face, while requiring a minimum amount of supporting circuitry. A method of economically and accurately fabricating the aforementioned transducer array by incrementally dicing bonded layers of solid discs of transducer materials being rigidly held together is also disclosed.

36 Claims, 14 Drawing Sheets

TWO-DIMENSIONAL ARRAY TRANSDUCER AND BEAMFORMER

BACKGROUND OF THE INVENTION

1. Field of the Invention

The present invention relates to a planar array sonar transducer which simultaneously forms multiple, narrow dispersion acoustic beam sets in two planar dimensions normal to the array face.

2. Description of Related Technology

Transducers which simultaneously generate multiple narrow acoustic beams inclined outward in two axes from a plane are currently used in different types of acoustic backscatter systems that measure velocity and/or distance in two or three dimensions. Examples include Acoustic Doppler Velocity Sensors (ADVS) which employ a simple set of four beams in a "Janus" configuration for two or three axis velocity measurement, sonars which measure distance to target in the water (such as forward scanning sonars), and bottom mapping sonars.

ADVS's are widely used for measurement of vertical profiles of water current measurements and for earth and/or water referenced velocity measurement for vessel navigation. They measure 3-axis velocities by measuring velocity along lines of position defined by narrow acoustic beams. A minimum of three beams oriented at different directions are required to measure the three orthogonal velocity components. Typically four narrow (1°–4°) conical transmit/receive beams are employed positioned in two axes of a plane surface and inclined relative to the normal to that plane. This configuration, well known in the acoustic arts, is referred to as a Janus configuration; the two sets of narrow conical beams are symmetrically inclined outward and positioned at four 90° circumferential increments on the surface of a larger (typically 60°) outward opening cone. Currently available transducer technology used to produce this four beam configuration include assemblies of 4-piston transducers or a pair of one-dimensional phased array transducers (i.e., arrays in which acoustic beams are formed in one plane only).

Conventional 4-piston transducer assemblies consist of four independent circular piston-type transducers, each producing a single narrowly dispersed conical transmit/receive beam directed normal to the piston face. As shown in FIG. 1, the four transducers are physically positioned in a rigid assembly to achieve the required Janus beam configuration. For conventional narrowband ADVS applications, each of these transducers requires an effective transmit and receive bandwidth of approximately 2% of the nominal acoustic carrier frequency. Typical carrier frequencies range from 100 kHz to 5 MHz. Each piston transducer is typically fabricated from either a single solid disc of ceramic material or from a flat array of small ceramic elements. Modern broadband ADVS's operate with fractional bandwidths on the order of 50%. They are also fabricated from solid ceramic discs or flat arrays, but have one or more additional impedance matching layers bonded to the face to achieve the required bandwidth. U.S. Pat. No. 5,343,443, "Broadband Acoustic Transducer", discloses such a system. The primary advantage of this 4-piston method is simplicity of the transducer construction and operation. Each piston transducer is driven by a separate signal, and no beamformer circuitry is required.

Single beam transducers such as those previously described may also be beamforming arrays. These arrays generally have all of the transducer elements electrically connected in parallel. Beam angle alignment is achieved primarily by virtue of proper positioning of the piston. Disadvantages associated with such arrays include 1) the requirement for a large, heavy mechanical structure to support the transducers; 2) the shape of its face, whether concave or convex, does not lend itself to a smooth hydrodynamic form unless a thick, acoustically transparent material with a flat face is attached to the front portion of the assembly; 3) a large aperture is required to form the beams; and 4) accurate measurement of velocity requires that the speed of sound at the transducer face be known.

An improved transducer physical configuration for producing the four Janus configuration beams in 2 axes for ADVS applications is to use a pair of one-dimensional phased array transducers. As shown in FIG. 2, a single one-dimensional planar array produces two conical beams inclined relative to the direction perpendicular to the longitudinal axis of the array (see U.S. Pat. No. 4,641,291, "Phased Array Doppler Sonar Transducer"). To produce the four ADVS beams, two adjacently positioned arrays are used, with one rotated 90° relative to the other about the aforementioned perpendicular direction. Since each one-dimensional array utilizes a single aperture, which is only slightly larger than a single beam piston, to produce two beams, a factor of approximately two improvement in aperture spatial efficiency is realized relative to the multiple piston approach.

One-dimensional phased arrays are typically constructed with parallel line arrays separated by a half wavelength of the carrier frequency. Each line array may be constructed using a number of small square or circular ceramic elements wired in parallel on both faces, or from a singular, elongated rectangular element. Alternate line arrays are wired together electrically in parallel to provide the necessary beamforming functions. One such wiring arrangement involves electrically connecting each fourth line array in parallel. Both circular and rectangular array geometries are used. To produce a beam dispersion of 4° required for a typical ADVS, an aperture of about 16 wavelengths (32 elements spaced at ½ wavelengths) in diameter is required. For typical ADVS operating frequencies in the range of 100 kHz to 5 MHz (single piece commercially available line elements normally operate in this region), an array of 32 parallel long elements is preferred over a 32×32 diced array (i.e., one which is cut or diced from a single solid element) due to production assembly cost advantages.

When the array is operating in the "receive" mode (i.e., receiving incoming signals), a simple phase shift beamformer is used to phase shift the signals received by the two arrays (assuming the configuration previously described) by ±90° to compensate for the time delay produced by acoustic propagation over the half wavelength path length in the medium between alternate line arrays. A phase shift is an approximation to time delay which is valid only for narrow fractional bandwidth signals. For narrowband signals, the summation process forms two receive beams inclined to the flat array plane surface. When operating in the "transmit" mode, the two arrays are driven by narrowband signals with appropriate relative phase shifts to form the four (two per array) simultaneously transmitted beams.

When these phased arrays are driven by wideband signals, the different frequencies contained in the signals are dispersed from the transducers in different angular directions, effectively broadening the beams. The phased array technique forms narrow beams only when signal bandwidths are less than about 3%. This is adequate for narrowband ADVS applications, but falls short of the bandwidth associated with modern broadband ADVS systems by a factor of roughly between 8 and 16 (see, for example, U.S. Pat. No. 5,483,499, "Broadband Acoustic Doppler Current Profiler").

An improvement in bandwidth/dispersion performance can be obtained for the pair of one-dimensional phased array transducers previously described by replacing the simple 90° phase shifting beamformer network (in both transmit and receive modes) with a more complex time-delay network. Use of the time delay decouples frequency from the relative angle of incidence of the received/transmitted wave, thereby reducing angular beam spreading in large bandwidth applications. With this time-delay array method, each of the individual line array signals are time delayed and summed together to form a composite signal which is independent of the angle of incidence. The primary drawback associated with this technique is the more complex transmit and receive beamformer.

An added performance benefit of the phased and time-delay array approach is that, for the ADVS application, the velocity components parallel to the array face are inherently self-correcting for changes in the speed of sound through the medium. As the speed of sound varies, differential path lengths and the corresponding time delays associated with various array transducers will vary accordingly. Self-correction results from the fact that the beam angle varies with the speed of sound in such a way as to directly compensate for errors in computing the velocity component parallel to the transducer face (usually horizontal). This minimizes, but does not completely eliminate, the need to measure sound velocity at the transducer face for high accuracy navigation.

Thus, relative to 4-piston assemblies, one-dimensional phased arrays provide improved spatial efficiency for fixed beam characteristics, have a flat face for better hydrodynamic performance, and have improved velocity resolution in media with varying sound propagation velocities, yet do not adequately support broadband ADVS operation. One-dimensional time-delay arrays have the added benefit of supporting broadband ADVS operation as well.

One-dimensional phased and time-delay array techniques are also commonly used for bottom mapping and forward scanning applications to form more than two beams within a single plane of the array face. For these applications, multiple phase and/or time-delay beamformers are coupled to a single one-dimensional array, each beamformer having different phase/time-delays to simultaneously form multiple beams at different angles of inclination relative to the array face, but all within a single planar orientation perpendicular to the array face. If measurement in a second planar orientation is required, two adjacent one-dimensional phase or time-delay arrays are used, with one physically rotated 90° from the other as previously described.

For each of the above mentioned techniques of forming multiple acoustic beams inclined within two planes perpendicular to the array face plane, an aperture of at least twice the size of that required to form any single narrow beam is necessary. It is possible to form two or more conical beams within two planes perpendicular to the array face if the proper signal can be provided to each element of the array. The formation of four beams in two perpendicular planes from a single planar array is depicted in FIG. 3. It is well understood in the art that such planar arrays can form beams centered around arbitrary angles relative to the array face if appropriate phase shifts are introduced between individual transducer elements; this concept has been in use for many years in radar antenna arrays and to a lesser extent in sonar transducer arrays. It is also well understood that beam forming for wide bandwidth applications requires true time delays between elements to compensate for the time delays produced by propagation over different path lengths in the medium associated with different elements.

A substantial reduction in the size, weight, and cost of the ADVS transducer assembly could be achieved if four inclined beams oriented in two planes perpendicular to the array face could be formed from a single planar array of transducer elements, using the full available aperture to form all beams, as shown in FIG. 3. To accomplish this, a 32×32 array of about 800 elements is required, with the array elements precisely aligned at ½ wavelength increments in both plane face dimensions, i.e., with respect to the X-Y coordinate system of FIG. 2. Assembly of this precision array from 800 individual elements is relatively complex. Complex phase and/or time-delay circuitry is also required to support beamforming in two dimensions for this large number of elements. Using existing array technology, a separate power amplifier and phase and/or time-delay circuit would generally be required for each individual element of the array. These array fabrication and beamformer complexity factors make the use of a two dimensional planar array an economically impractical solution for nearly all applications.

Hence, it would be highly desirable to provide an improved planar array which could produce narrow dispersion beam sets in two dimensions relative to the array face within a substantially reduced aperture, and which would utilize simplified phase and/or time-delay beamforming circuitry to support the large number of individual transducer elements inherent in such arrays. Furthermore, it would be highly desirable to provide an efficient and cost-effective method of fabricating the aforementioned array to make its manufacture and use economically practical.

SUMMARY OF THE INVENTION

The present invention satisfies the aforementioned needs by providing an improved system and method of forming a multi-planar narrowband or broadband beam set inclined relative to a transducer array face, with reduced aperture area. A cost effective and simplified method for manufacturing the transducer array is also disclosed.

In a first aspect of the invention, each 2-axis beam set formed from the single 2-axis planar array of transducer elements uses all of the elements in the array and the full available aperture to form each of the beams. From an aperture spatial efficiency viewpoint, this is an optimal approach to forming multiple narrow 2-axis beams, because each beam can be made as narrow as allowed by the available aperture area. The overall aperture area will be minimized for a given beamwidth of each of the multiple 2-axis beams. Relative to the previously described 4-piston approach, the aperture diameter is reduced by a factor of 2.5, (a factor of 6 for the area), the transducer face is substantially more hydrodynamic (thereby reducing flow resistance, noise, and potential inaccuracies resulting from air coalescing near the aperture), and the transducer assembly volume is reduced by a factor of roughly 10. Relative to the previously described dual 1-dimensional array approach, the aperture area is reduced by a factor of two.

In a second aspect of the invention, the multi-planar (2 axis) array disclosed herein utilizes a greatly reduced number of phase or time-delay beamforming circuits relative to the number of elements in the array. The capability to produce multiple narrow beams in two axes from a single planar array is achieved by a method of electrically interfacing independently with the two sides of the array permitting independent and simultaneous formation of multiple inclined transmit and receive beams in two dimensions of the array plane. This is accomplished by electrically connecting together the backside rows and frontside columns of the array, connecting the backside and frontside parallel sets to beamformer networks which have a low electrical impedance (relative to the impedance of the rows and columns) in both the transmit and receive mode of operation, and processing the transmit/receive signals to/from the two array sides to simultaneously and independently form multiple inclined transmit/receive beams in two dimensions of the array plane. The two directions are normally but not necessarily orthogonal to each other.

In another aspect of the invention, a cost effective method of fabricating the planar array of approximately 800 precisely aligned elements is disclosed. While, as previously described, prior art one-dimensional multibeam arrays may be fabricated from an array of on the order of 32 long rectangular transducer elements of about ½ wavelength in width, the preferred embodiment of the present invention requires the use of array elements which have dimensions of approximately ½ wavelength of carrier frequency in both face dimensions. Furthermore to achieve the necessary bandwidth for broadband applications, each element must be constructed of several layers of different materials which must be bonded together. Hence, an array of roughly 800 multi-layered elements (32×32) is required to be precisely assembled in a cost effective manner to make the aforementioned design economically feasible. To accomplish this, an improved method of fabricating this complex array is disclosed in which several cylindrical discs (each having a diameter equal to that of the final array) are sequentially bonded together and partially sliced with a parallel diamond blade saw at various stages of the process such that at all stages of fabrication, the sliced elements are rigidly held together by a solid layer. When completed, the array is internally diced into the desired form with the required precision, and held in shape by the combination of a mechanically rigid and acoustically transparent front facing and a solid backing disc.

The aforementioned simplified design and fabrication techniques make it economically practical to produce cost effective commercial products with the form and performance advantages of the 2-dimensional flat array. The present invention provides significantly improved performance for typical ADVS (i.e. a four beam 150 kHz transducer with 4° one-way beamwidths) applications. These and other objects and features of the present invention will become more fully apparent from the following description and appended claims taken in conjunction with the following drawings.

DETAILED DESCRIPTION OF THE PREFERRED EMBODIMENT

Reference is now made to the drawings wherein like numerals refer to like parts throughout. The discussion in this section is organized with headings as follows: Functional Description, Hardware Description and Fabrication Description.

Figure 4:
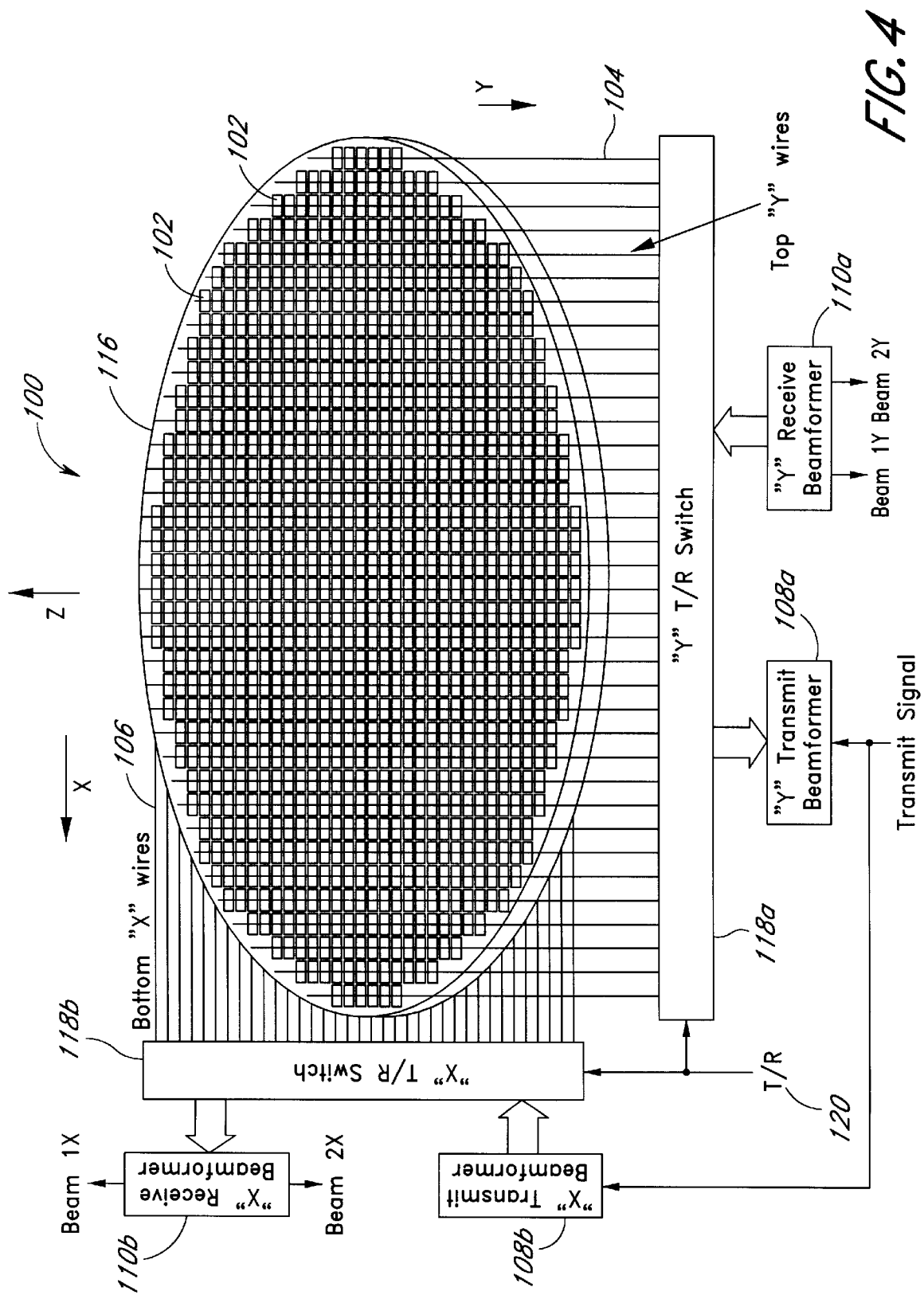
FIG. 4 a functional block diagram of the preferred embodiment of the two-dimensional transducer array, including the method of electrical array element interconnection, and the method of array-to-beamformer interconnection to the transmit and receive beamformers.

1. Functional Description:

A block diagram of the preferred embodiment of the two-dimensional transducer array is shown in FIG. 4. A typical planar acoustic transducer array configuration 100 is depicted. Individual Array elements 102 are electrically interconnected along front-side columns 104 and back-side rows 106. Array elements 102 are interconnected to the associated beamformer 108, 110 through 2-axis transmit/receive (T/R) switches 118. The transmit 108 and receive 110 beamformers may be either phase or time-delay beamforming networks. The coordinate system used for the purposes of this description is as shown with the rows 106 oriented in the X axis, columns 104 in the Y axis, and the Z axis normal to the plane face 116.

The array face 116 is circular, but other form factors such as ellipses or polygons which are generally symmetrical in the two face dimensions are also suitable for forming narrow inclined beams of general conical form. The array is composed of a large number of small elements 102 which have symmetrical faces, typically square, circular, or rectangular in form (i.e., their facial crossection). The face width of each element is approximately 0.5λ, where λ is the acoustic wavelength in water of the desired center frequency. To form beams with 4° beam width, an array diameter of approximately 16λ is required, consisting of a 32×32 element array of approximately 800 elements. The back side rows 106 (X direction) and front side columns 104 (Y direction) of the array elements are electrically connected together along parallel lines of elements with thin acoustically transparent material, as shown in FIG. 4. The rows and columns are normally but not necessarily orthogonal to each other.

Each of the array X axis rows 106 and Y axis columns 104 are connected to a T/R switch 118 which, as controlled by a T/R logic signal 120, electrically connects the sets of X and Y lines to respective X and Y receive beamformers 110 in the receive mode, and to X and Y transmit beamformers 108 in the transmit mode. When in the transmit mode, the array lines are connected through the T/R switch 118 to the transmit beamformers 108 which provide the electrical transmit drive signals from a low impedance electrical source (relative to the electrical impedance of the line of transducer elements). When in the receive mode, the array lines are connected through the T/R switch to receive beamformers 110 which receive the electrical signals from the transducer lines while providing a low electrical impedance path (relative to the electrical impedance of the line of transducer elements) to signal ground on each X and Y line.

This low electrical source/load impedance on each Y and Y line (low source impedance during transmit and low load impedance during receive) allows simultaneous and independent access to each X row 106 and Y column 104 for application of transmit electrical drive signals and receipt of signals from each X row and Y column. Furthermore, parallel sets of X and Y axis line arrays can be simultaneously and independently formed. X-axis transmit and receive line arrays are formed by the parallel electrical connection along the back side rows 106 and the presence of the low impedance signal ground on all of the front side Y-axis columns 104.

During transmit mode, transmit drive signals are applied through the T/R switch to the parallel X-axis back side electrical interconnection lines from a transmit amplifier which has a low output impedance relative to signal ground. While the X-axis drive signals are being applied to individual X-axis line arrays, the entire Y-axis 32 parallel line array face is maintained as a low impedance path to signal ground (via the signal path through the Y-axis T/R switch 118*a* to the low impedance Y-axis drivers of the Y beamformer 108*a*) to ensure that the X-axis drive signal is imposed solely across the X-axis rows, and does not couple to the Y-axis side of the array. Similarly, while the Y-axis drive signals are being applied to Y-axis line arrays, the entire X-axis array face is maintained as a low impedance path to signal ground to allow signals to be independently applied the Y-axis without coupling to the X-axis. Thus, by superposition of both X and Y axis transmit drive signals, the low impedance associated with the transmit beamformer sources permits X- and Y-axis line transmit arrays to be formed simultaneously and independently.

During receive mode, the electrical signal present on each X-axis row 106 (with the front side low impedance path to signal ground) represents the sum of the received electrical signals of all elements in each row. Most conventional sonar receiver amplifiers provide a high impedance load to the receiving transducer. However, for the 2-dimensional array application of the present invention, an amplifier has been developed for use in the receiving beamformer which provides a low impedance load while receiving. This is accomplished by connecting each of the X and Y-axis lines to a virtual ground node (a point having the same potential level as ground but not directly connected to ground) on the receiving preamplifier within the receive beamformers. The signal current flowing into each virtual ground node is the sum of the signal currents from all the ceramic elements in the column or row. When receiving signals from a column, the column signal is independent of the row signals being simultaneously received due to the low impedance load presented by the virtual ground on all rows. Similarly, when receiving signals from row, because of the low impedance load presented by the virtual ground on all columns, this row signal is independent of the column signals being simultaneously received.

This independent and simultaneous X row and Y column electrical access during both transmit and receive modes via the X and Y signal lines allows the array to be used as a 2-dimensional array to simultaneously and independently form multiple inclined acoustic beam set in both the X-Z and Y-Z planes. The beamforming operation in each plane is the same as conventional 1-dimensional phased and/or time-delay arrays. Thus, the 2-dimensional beamforming operation is in general the equivalent of two overlaid 1-dimensional arrays, with one array rotated 90°.

During transmit mode operation, phase or time-delayed signals applied to the X rows form inclined acoustic transmit beams in the Y direction (YZ plane). Simultaneously and independently, phase or time-delayed signals applied to the Y columns to produce inclined acoustic transmit beams in the X direction (XZ plane). During receive mode operation electrical signals received on the X rows are phase or time delayed and combined in the X row receiver beamformer to produce inclined receive acoustic beams in the Y direction. Simultaneously and independently, signals received on the Y columns and combined in the Y side beamformer produce inclined receive acoustic beams in the X direction. Thus, through superposition of the X and Y axis electrical and acoustic signals, 2-dimensional acoustic beam formation from a single planar array in both transmit and receive modes is achieved.

To understand the fundamental principles of operation how these two-dimensional transmit and receive acoustic beams are formed, the operation of sixteen element array subset of the 32×32 element two-dimensional array transducer is considered. Operation with both phase (narrowband) and time-delay (narrowband or broadband) beamformers is described herein.

Phased Array Operation

Figure 5:
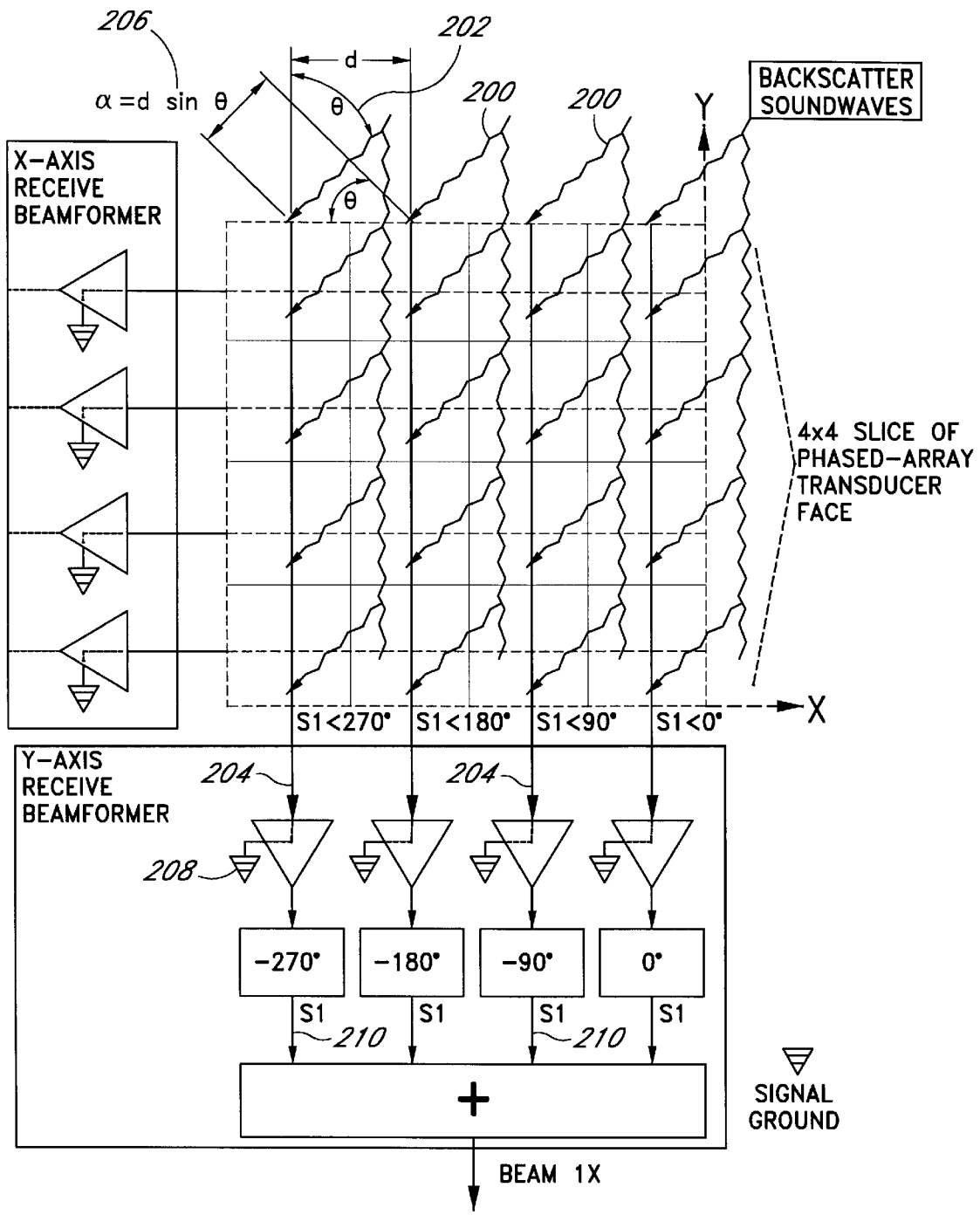
FIG. 5 is a functional block diagram illustrating the operation of a simplified sixteen element 2-dimensional phased array transducer operating in the receive mode.
Figure 6:
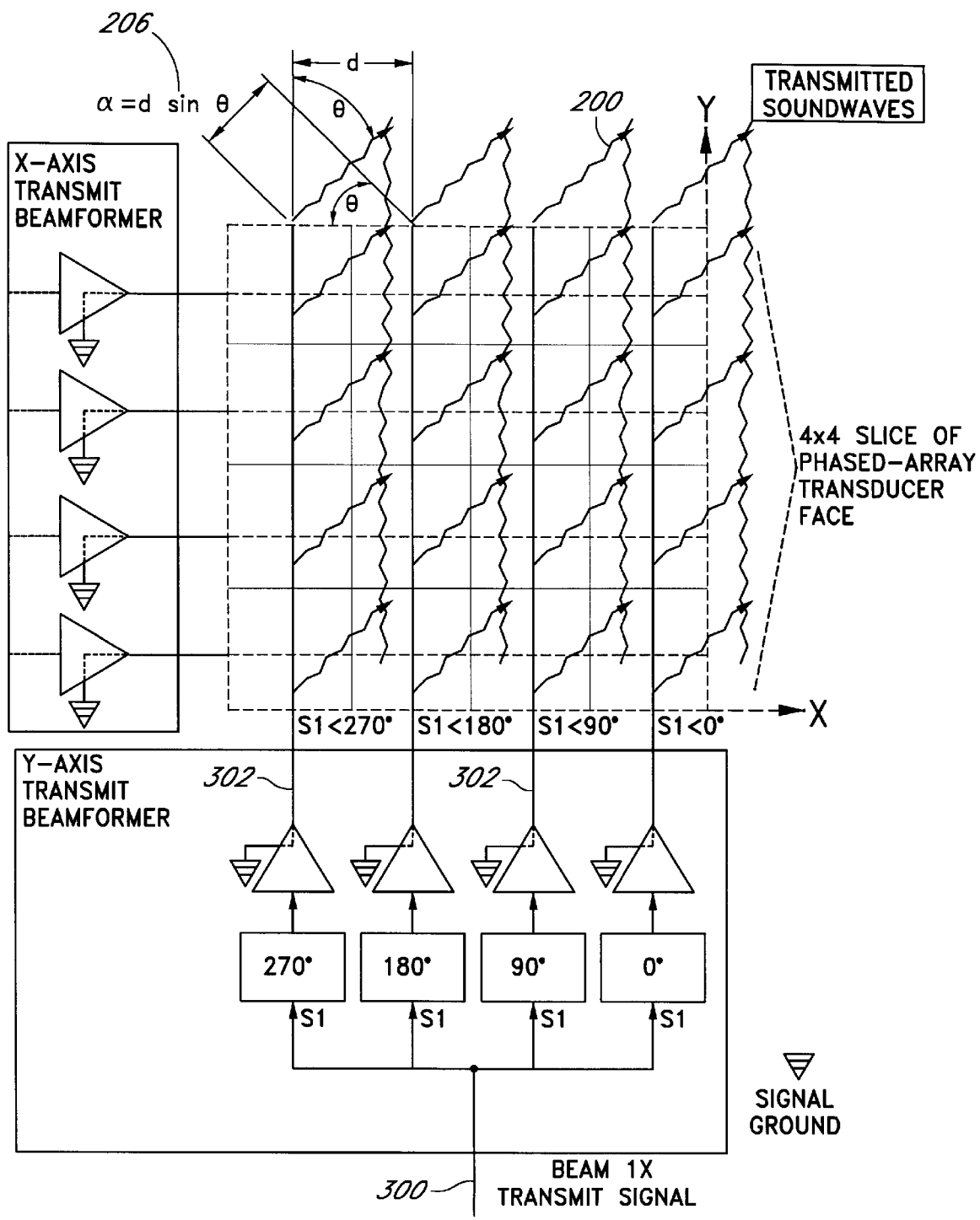
FIG. 6 is a functional block diagram illustrating the operation of a simplified sixteen element 2-dimensional phased array transducer operating in the transmit mode.

Operation of a sixteen-element (4×4) subset of the previously described two-dimensional array with a phase-shift beamformer is illustrated in FIGS. 5 and 6. During receipt of a long tone burst acoustic signal at a single frequency (narrowband), f, with wavelength, λ=c/f, where c is the sound propagation velocity in the fluid media, incoming sound ray wavefronts 200 traveling in the −X direction and at an angle θ 202 with the Z axis (Z being normal to the array plane, or normal to the plane of the Figure) travel different distances to each of the Y-axis (frontside) column line-arrays 204, and thus strike each of the line arrays at different times, and in general, with different phases. As illustrated in FIG. 5, the path length differences between adjacent line-arrays (α) 206 is related to the element center-to-center separation distance (d) by $$\alpha = d \sin \theta.$$

The wavefront arrival time differences (τ) between adjacent line-arrays is $$\tau = \alpha/c = (d/c)\sin\theta$$

If the elements are spaced at distances corresponding to a half-wavelength of the arriving narrowband signal ($d=\lambda/2$), the path length difference expressed in terms of arriving signal wavelengths is given by $$\alpha = (\lambda/2)\sin\theta.$$

For an arrival angle of 30°, $$\alpha = (\lambda/2)\sin 30 = \lambda/4.$$

This corresponds to an inter-element angular phase shift of 90° for arriving narrowband signals. Thus, when the narrowband pulse is being received by all Y-axis line-arrays with the backside coupled to the low impedance virtual grounds 208 as described above, the received electrical signal phases along the set of four Y-axis line-arrays will be 0, 90, 180, and 270 degrees, respectively.

Receive operation of the frontside (Y) columns with the backside rows 106 all coupled to signal ground in the X-axis receive beamformer 110b will first be considered. Each set of four X-axis electrical signals (in the 4×4 array used for illustration) are connected to virtual ground nodes 208 in the receiver preamplifier of the receive beamformer 110a to form a signal reference for the backside rows, and phase shifted −90° between adjacent line-arrays (0, −90, −180, and −270 degrees), as shown. The imposed phase shifts compensate for those arising from the different inter-element path lengths of the narrowband acoustic pulse incident on the line arrays, as illustrated in FIG. 5. The resulting four signals 210 will be in phase and, when summed, will form a maximum acoustic interference pattern when receiving a wavefront arriving at a 30° incidence angle. This maximum corresponds to the central axis of one of the main lobes of the formed beams.

A second receive beam can be formed for incoming sound ray wavefronts traveling in the −X direction and at an angle θ with the Z direction (at a −30° incidence angle) by reversing the sign of the 90° imposed phase shift on the four signals and summing the signals. Since the set of four signal phases repeats for additional sets of four line-arrays, larger arrays can be implemented by summing the signals from all sets of four line-arrays to further enhance the interference patterns at ±30°. When additional sets of four line-array segments are utilized as described, the acoustic signal gain along the ±30° directions is increased, or correspondingly, the beamwidth in that direction is reduced, as additional sets of arrays are added.

Figure 1:
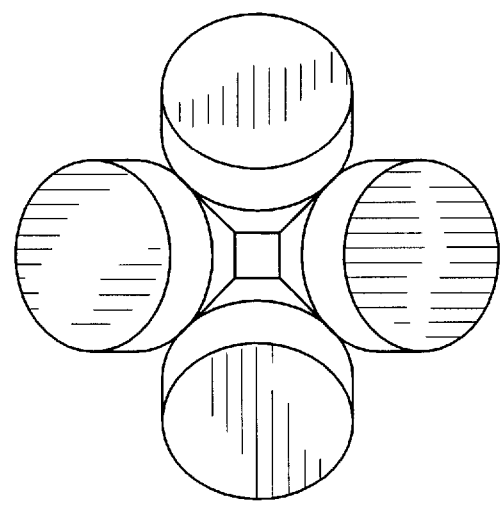
FIG. 1 is a top view of a prior art 4-piston transducer array in Janus configuration.
Figure 2:
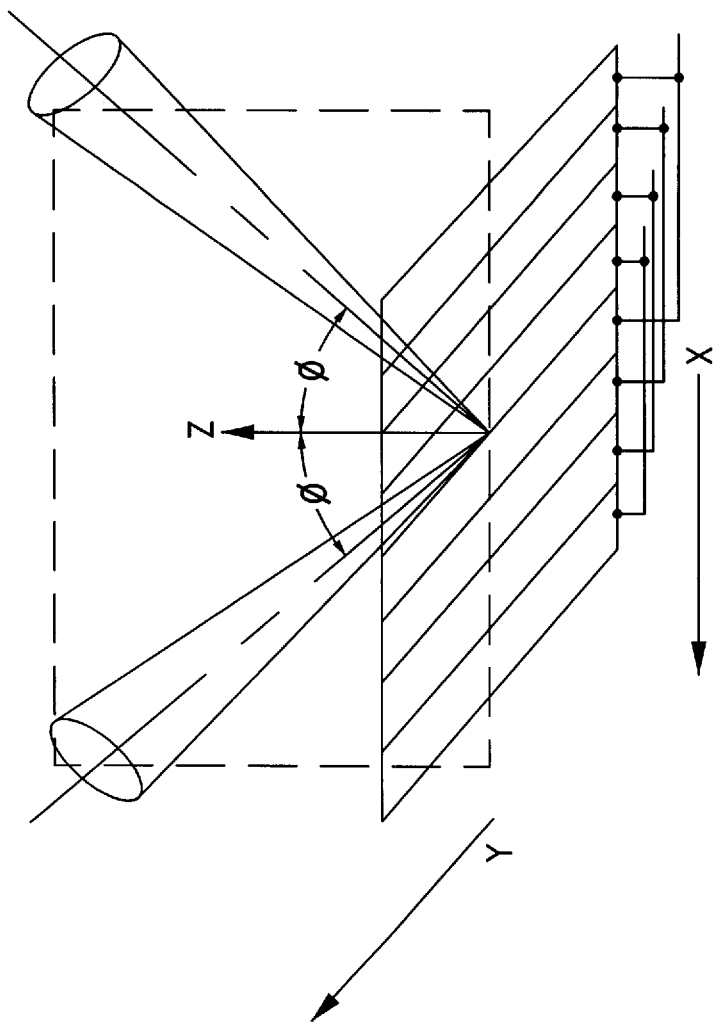
FIG. 2 is a perspective view of a prior art one-dimensional phased acoustic array, illustrating the formation of two narrow acoustic beams.

An equivalent beamforming method is to first sum all of the equal phase signals from different array sets, then apply the imposed 90° phase shifts between the summed set of four signals. This can be accomplished by simply electrically connecting each fourth line-array in parallel, as is commonly done in practice for one-dimensional phased arrays as previously described (see FIG. 2). The effective beamwidth in the X direction is determined by the number of line-array sets in the array. In the Y direction, the beamwidth is determined by the beam patterns of the line-arrays, which is inversely proportional to the length (in acoustic wavelengths) of the array lines. For the ADVS application, narrow inclined acoustic beams with similar widths in both planes are desired and the X and Y plane dimensions are maintained about the same.

During the transmit mode, operation of the 2-axis array is similar to the above described receive mode except the flow of signals is reversed, as illustrated in FIG. 6. Transmit operation of the frontside columns with the backside rows all coupled to signal ground will first be considered. A long tone burst carrier frequency 300 is applied to a phase shift transmit beamformer 108a, generating four drive signals with relative phases of 0, 90, 180 and 270 degrees. These are applied to the four parallel wired sets 302 of Y columns from low impedance drivers. The imposed phase shifts will compensate for those arising from the different path lengths between line arrays, and a transmitted acoustic signal interference pattern at a 30° incidence angle will be formed, corresponding to the center of one of the main beam lobes. Another transmitted beam can be formed at a −30° incidence angle by reversing the sign of the 90° imposed phase shift as previously described.

Receive and transmit operation in the Y-axis is the same. When considering signals applied and received from the backside rows, the frontside columns are coupled through a low impedance to signal ground. The presence of the low transmit drive and receiver load impedance to ground on each side results in fully independent X and Y axis operation. From superposition of the X and Y axis signals, it can also be seen that both axes (i.e., rows and columns) can be in operation simultaneously.

Figure 3:
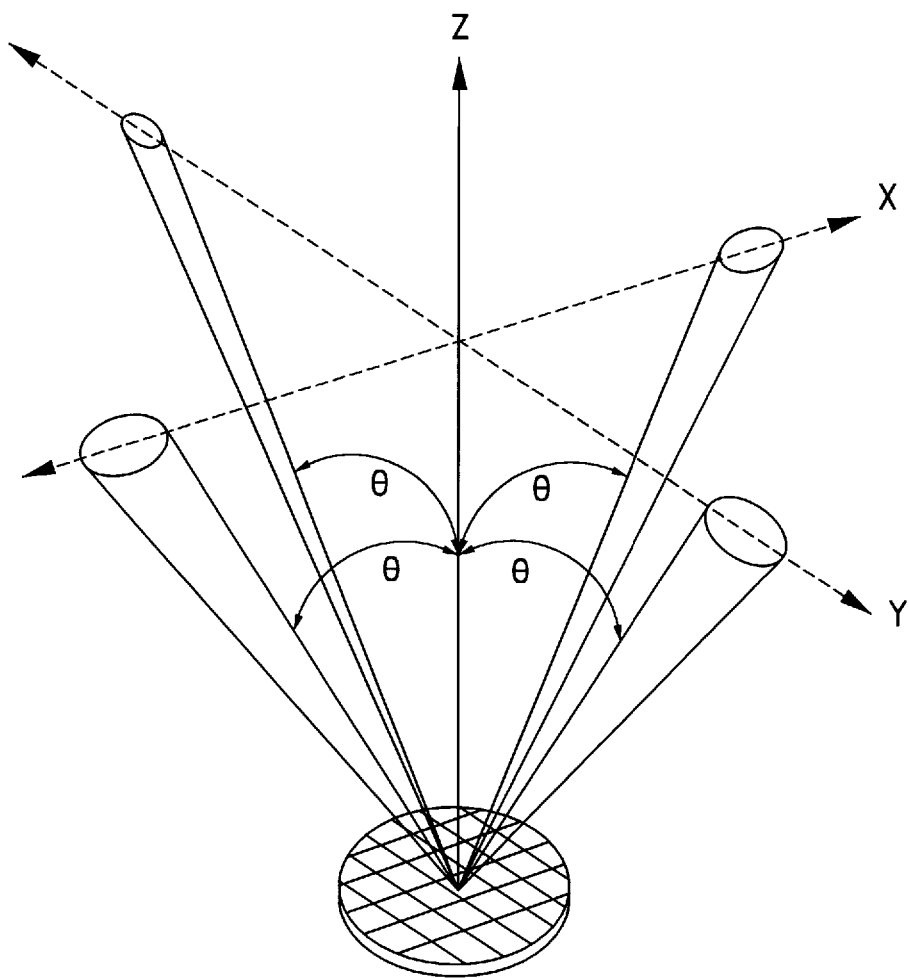
FIG. 3 is a perspective view illustrating a typical configuration of four acoustic beams inclined relative to the array normal (i.e., Z-axis) and positioned within two planes perpendicular to the array face plane (i.e., X-Y plane).

The above described 2-axis beamforming technique using fixed phase delays in forming narrow transmit and receive beams and is referred to as a "two-dimensional phased array" transducer. It is suitable for use in narrowband applications which transmit a single frequency (narrowband) long tone burst. Four inclined narrow beams positioned in the X-Z and Y-Z planes and all inclined at an angle relative to the Z direction are formed from a single flat array aperture, as shown in FIG. 3.

From the sound ray diagram in FIG. 5, it is seen that for a fixed element spacing of d, the angle of each beam is related to the acoustic frequency by $$\theta = \sin^{-1}(\lambda/4d) = \sin^{-1}(c/4fd).$$

Thus, the beam angle will be frequency dependent and, if the incoming or outgoing wave has a broad spectrum, the mainlobe beam pattern will be correspondingly broadened in angular space. Because of this bandwidth induced beam spreading, the phased array technique described above does not work with broadband ADVS's which transmit signals with a broad spectrum (typically 20–50% of the carrier frequency). To use this 2-dimensional array method with broadband signals requires an alternate time-delay beamforming method, as described in the following paragraphs.

Time Delay Array Operation:

As previously shown, incoming sound ray wavefronts traveling in the −X direction at a velocity c and at an angle θ with the Z direction, strike the various Y-axis front side column line-array locations at different times due to the path length differences between adjacent line-arrays. The path length distance difference, α, was shown to be equal to d sin θ. The corresponding path length time delay difference (τ) is (d sin θ)/c. While the phased array employs a beamformer which compensates for the inter-element phase delays which apply only for narrowband signals, the time delay array employs a beamformer which compensates for the inter-element time delays which apply for signals of broader frequency band.

Figure 7:
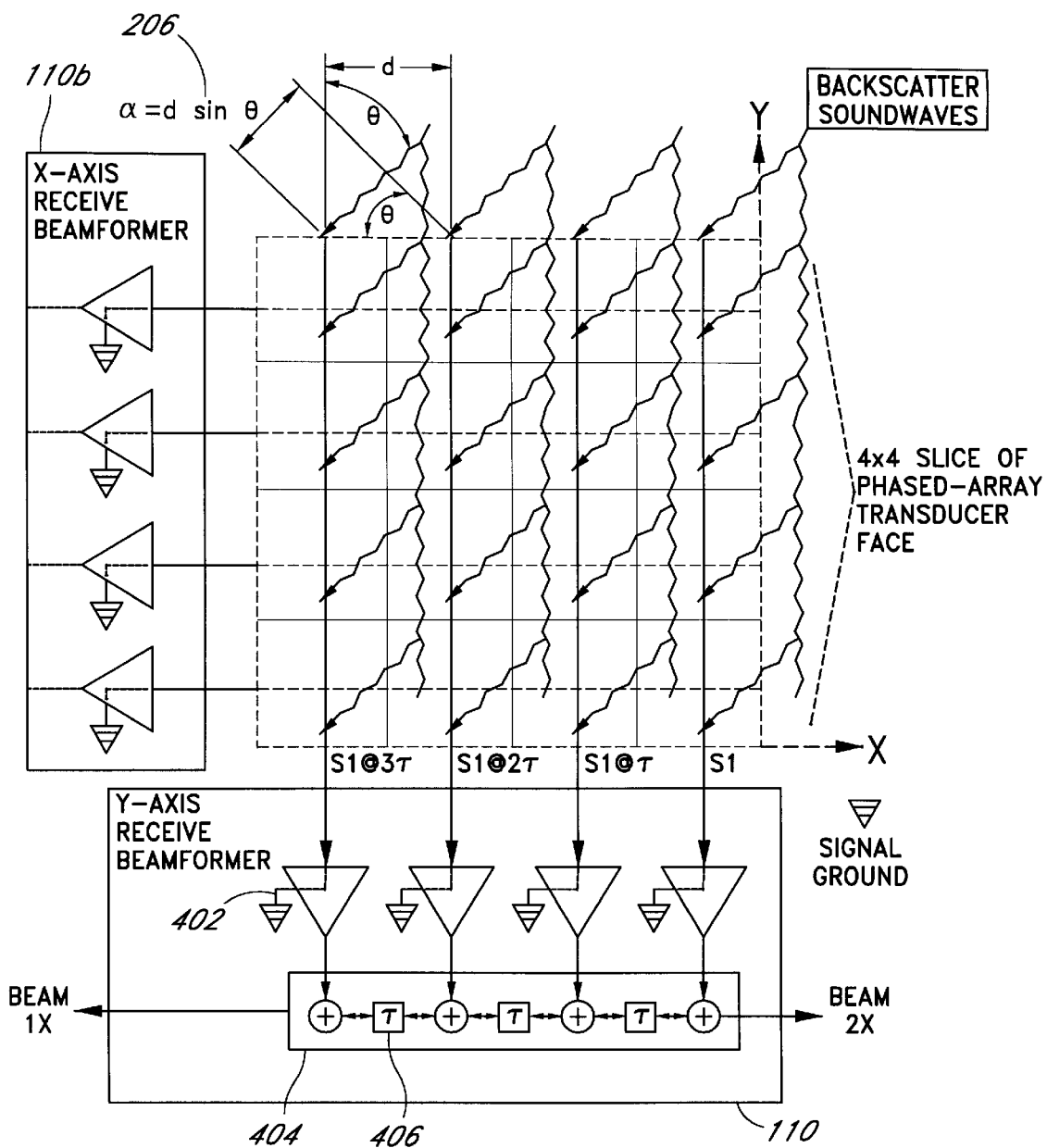
FIG. 7 is a functional block diagram illustrating the operation of a simplified sixteen element 2-dimensional time-delay transducer operating in the receive mode.

Considering now the receive mode of operation of a 4×4 array subset as illustrated in FIG. 7, with the backside rows connected to virtual ground in the X-axis receive beamformer 110b, each set of four Y-axis electrical received signals are connected to virtual ground nodes in the receiver beamformer amplifiers 402 to form a signal reference for the backside rows. The amplifier outputs are applied to a tapped bidirectional time-delay summing network 404 as shown in FIG. 7. The imposed inter-element electrical time delay 406, τ, compensates for the time delay arising from the different inter-element path lengths of the arriving acoustic signals, resulting in formation of two beams in the ±X-axis (X–Z plane) at incidence angles of $$\theta = \sin^{-1}(c\tau/d).$$

By inspection of this equation, it can be appreciated that the beam angles are now independent of the acoustic frequency, and thus not spatially broadened in space by a broad frequency spectrum. This broadband capability is the primary benefit of the time-delay technique over the previously described phase shift technique.

Figure 8:
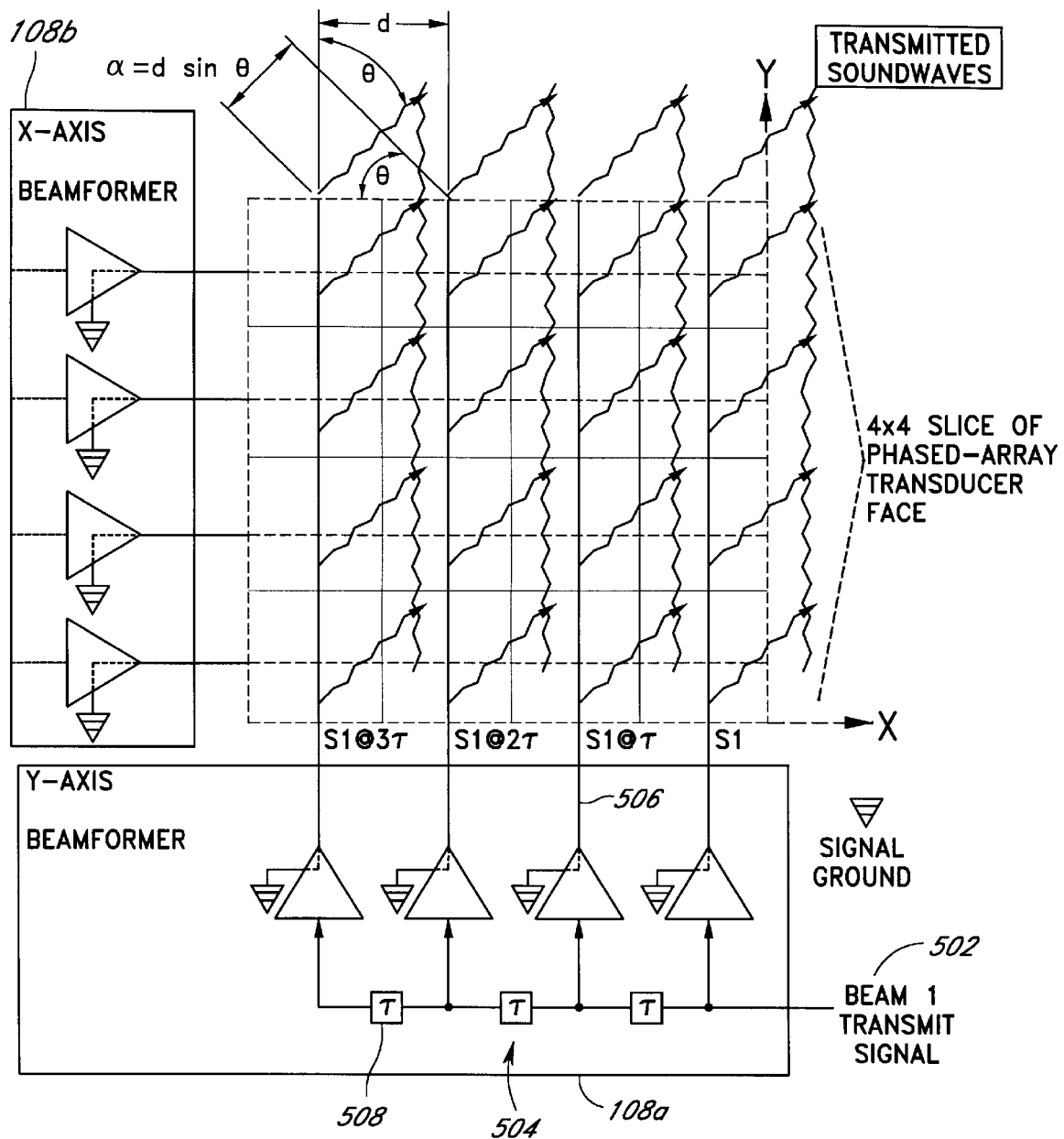
FIG. 8 is a functional block diagram illustrating the operation of a simplified sixteen element 2-dimensional time-delay transducer operating in the transmit mode.

During the transmit mode, operation of the 4×4 array is similar to the above described receive mode except the flow of signals is reversed as illustrated in FIG. 8. Considering first the operation of the frontside columns with the backside rows all coupled to signal ground in the X-axis beamformer 500, the transmit signal 502 is applied to a time delay transmit beamformer 504, generating four drive signals with relative time delays 508 of 0, τ, 2τ, and 3τ. These are applied to the four parallel wired sets 506 of Y columns from low output impedance drivers. The imposed time delays compensate for the time delays arising from the different path lengths between line arrays, and a transmitted acoustic signal interference pattern at an incidence angle θ will be formed, corresponding to the center of one of the main beam lobes. Another transmitted beam can be formed at a −θ incidence angle by reversing the direction of the signal flow through the time delay network.

Time-delay array receive and transmit operation in the other dimension (Y-axis) is completely analogous to that previously described. In Y-axis operation, signals are applied to and received from the backside rows while the frontside columns are coupled through a low impedance to signal ground. The presence of the low transmit drive and receiver load impedance to signal ground on each side results in complete independence of X and Y axis operation; accordingly, both X and Y axes can be in operation simultaneously.

Figure 9:
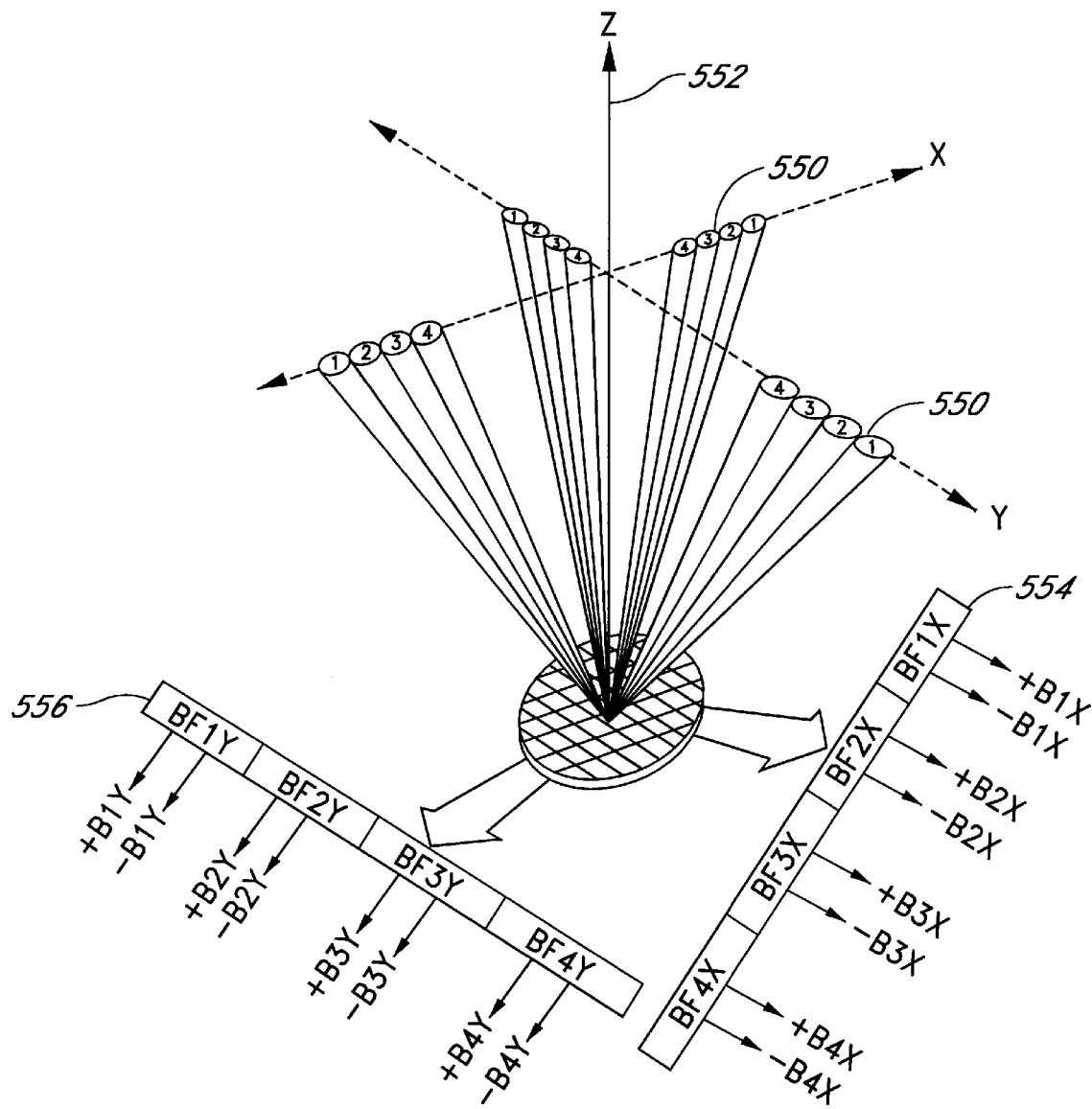
FIG. 9 is a perspective view illustrating the formation of multiple beams in two planes perpendicular to the face of an array using the time-delay technique.

For large arrays, the aforementioned time-delay method is more complex to implement than the phase shift method because a separate time delay element is required between each individual line-array, whereas only four discrete phase shifts are required when utilizing the phase shift method. A 32 element time delay network is required for a 32 element array, thereby substantially increasing the complexity of a time delay array over a corresponding phased array of similar size. A further advantage of the time delay approach (in addition to the ability to form narrow beams in broadband operating environments) is that because the beam angle θ is determined by $\sin^{-1}$ (cτ/d) for a single fixed array physical configuration (element spacing d being fixed), multiple inclined beams in each axis can easily be formed by using a different set of time delays for each beam set. This concept is illustrated in FIG. 9. In this example, four sets of 4-beam combinations 550 oriented symmetrically about the Z axis 552 at four inclination angles θ are achieved by utilizing four sets of X and Y beamformers (BF1X–BF4X 554 and BF1Y–BF4Y 556), each set operating as described above for the basic time-delay array.

2. Hardware Description

As can be appreciated from the previous description, the present invention may be embodied to produce many combinations of 2-axis inclined beams with different carrier frequency, beam characteristics and signal bandwidth capabilities. The specific preferred hardware embodiment described in this section employs the time-delay beamformer which was functionally described in the previous section, and produces two narrow beamwidth broadband beams at a 150 kHz carrier frequency in each of two axes for use in ADVS applications.

The hardware associated with the preferred embodiment disclosed herein is comprised of a circular transducer array and two substantially identical beamforming networks, each of which provide the electrical signal transfer to form two inclined transmit/receive beams. A top view of the transducer array is provided in FIG. 10. The diameter D 600 of the array is approximately 160 mm. There are 800 individual square faced 150 kHz piezo-electrical ceramic elements 102 closely spaced at a center to center distance of 5 mm 604 (about ½ wavelength at 150 kHz, based on a propagation velocity of roughly 1500 m/s).

Figure 10:
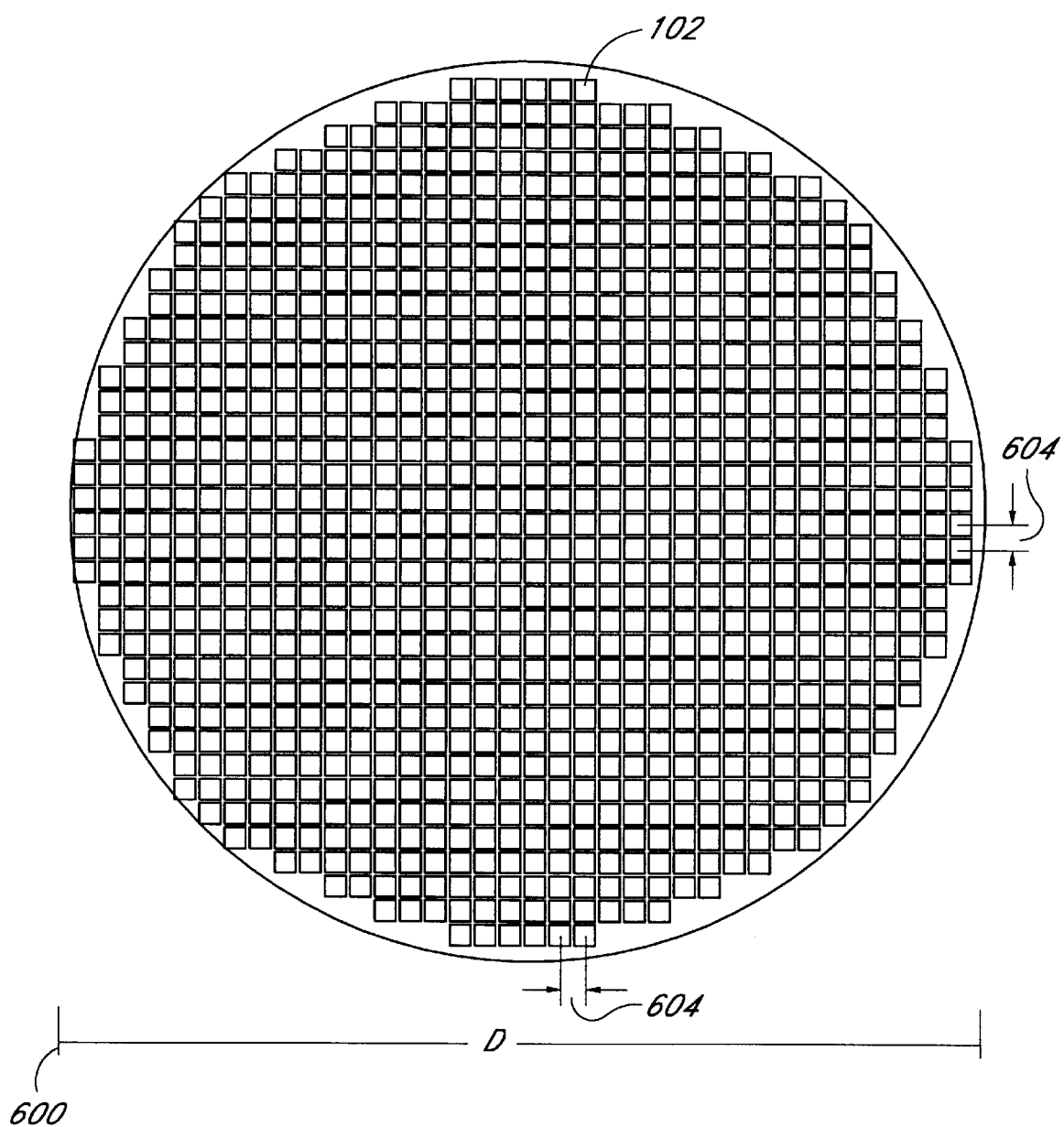
FIG. 10 is a top view of one preferred circular 150 kHz transducer array with 800 individual square faced piezoelectrical ceramic elements closely spaced at a center-to-center distance of 5 mm.
Figure 11:
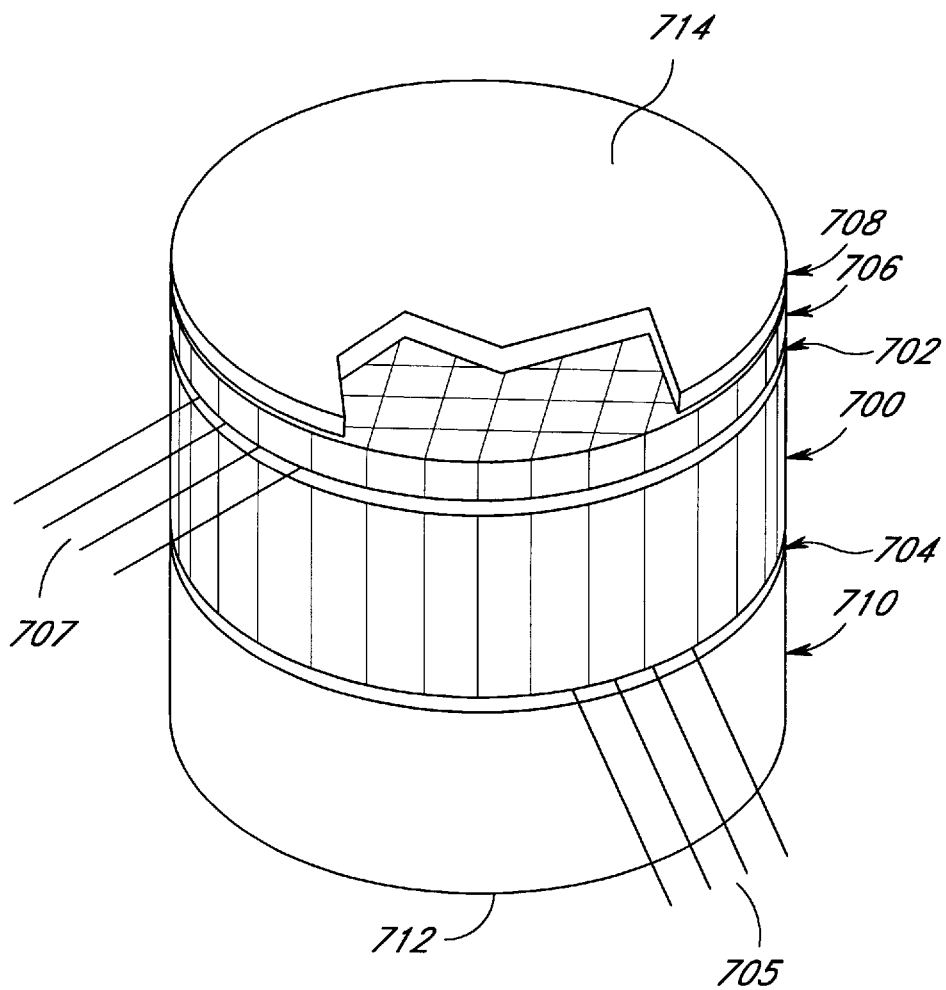
FIG. 11 is a perspective view of one preferred embodiment of the transducer assembly with the thickness dimension expanded to illustrate the layered construction thereof.

The multilayer construction of the transducer array is illustrated in the three dimensional view shown in FIG. 11. This thickness dimension in this view is expanded to show the layered structure. The ceramic array elements 700, e.g., the 800 elements 102 shown in FIG. 10 are electrically and mechanically connected by two pieces of thin, acoustically transparent flexible printed circuits (FPC) 702, 704 on the top and bottom surfaces of the ceramics. Such circuits may be fabricated from Kapton™ (polyimide) or other suitable material. Electrical connection to each ceramic element 700 is achieved by press fitting and bonding (or alternatively, low temperature soldering) the printed electrical conductor lines to the conductive face of the array elements. Bonding may be accomplished by use of a suitable adhesive or glue, although it can be appreciated that other forms of bonding may also be suitable. The connection pattern is along element columns on the front side and along rows on the back side, with access to columns on one side (Y wires 705) and rows on another side (X wires 707). A piece of ⅛ inch (3.18 mm) thick fiberglass material 706 (such as that bearing the tradename "G-10" or other similar material) with face dimensions matching the ceramic is bonded to the front of the top flexible circuit on each 150 kHz transducer array. This fiberglass (G-10 or equivalent) piece is an acoustic quarter wave transformer used to improve the impedance coupling between the array and water, and to significantly increase the transducer element bandwidth. The significant increase in the transducer bandwidth is required by the broadband ADVS technology. A layer of urethane 708 bonded to the front of the fiberglass piece seals the face to the water in front. A layer of air filled cardboard 710 is placed between the back plane of the housing 712 and the back of the bottom flexible circuit to reflect the acoustic energy transmitted backward and to provide the necessary mechanical support against the water pressure incident on the front of the transducer array surface 714.

Figure 12:
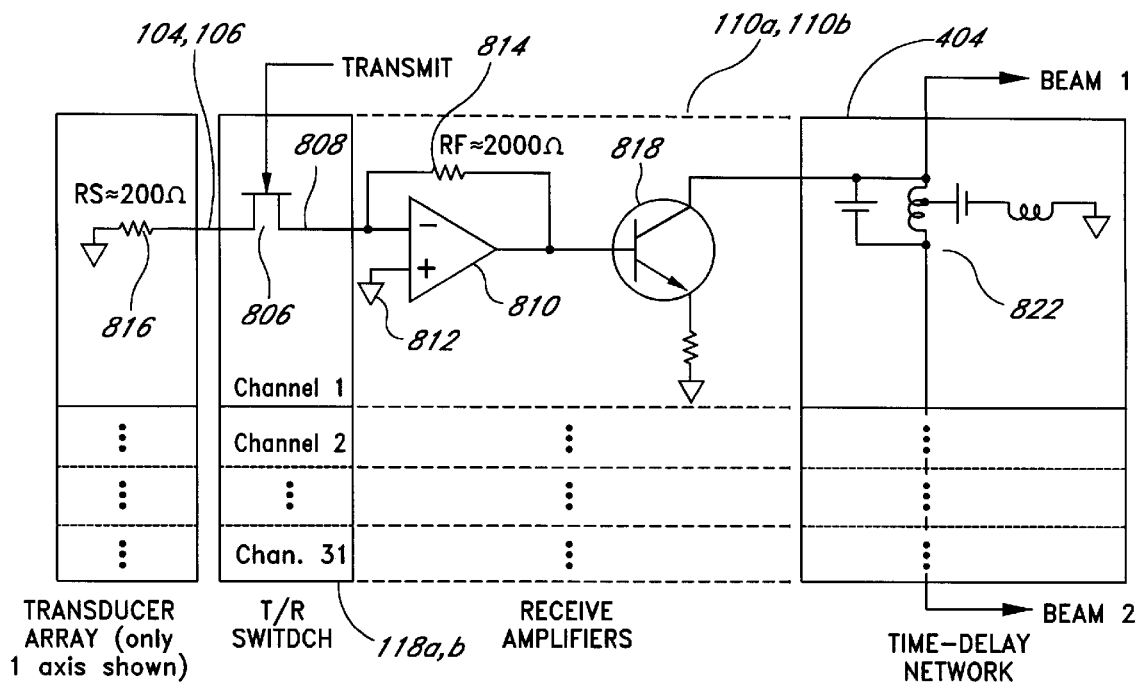
FIG. 12 is a schematic block diagram of one preferred embodiment of the time-delay receive beamformer used in conjunction with the present invention.

The preferred time-delay receive mode beamformer circuitry (one axis only) is illustrated in FIG. 12. In the receive mode of operation, the received signals from all frontside columns and backside rows 104, 106 are coupled to the X and Y axis beamformers 110a, 110b, respectively, through T/R switches 118. Each T/R switch is implemented with a Field Effect Transistor (FET) 806 in series with the receiver amplifier input terminals 808. A virtual ground low impedance load on all X and Y lines during receive mode operation is implemented with a high gain differential preamplifier 810 which has a low noise figure when coupled to the relatively low impedance transducer line arrays. Each X and Y transducer line array is connected to the negative terminal of the high input impedance differential amplifier, the positive terminal is connected to signal ground 812, and a feedback impedance 814 is connected between the low impedance preamplifier output and the negative input terminal. This forms a well known inverting operational amplifier configuration (the resulting gain of the amplifier is proportional to the negative of the ratio of the feedback impedance to source impedance 816) with the transducer line array providing the input signal with a source impedance 816 equal to the electrical impedance of the line array. If the amplifier open loop gain is much higher than the closed loop gain determined by the ratio of the feedback resistor to the source impedance of each 150 kHz line array (≈200 ohms), the voltage across the input terminals will be small with respect to the received signal. Since the positive amplifier terminal is grounded, the negative terminal is maintained by the amplifier loop action at essentially ground potential also. Thus, the negative terminal input 808 is considered a "virtual" ground.

The output of the preamplifier is converted to a high output impedance current source via a transistor 818 which injects the signal current derived from the line array into a tapped analog time-delay summing network 404. This network has 32 taps (corresponding to each of the 32 rows or columns used in each dimension); each segment between the taps has a time delay of t microseconds, corresponding to the delay required to compensate for the t microsecond acoustic time delay occurring for arriving and departing signals at the line arrays at the chosen angle of incidence. Each time-delay segment is implemented with a four-component inductor/capacitor network 822 which approximates a second order all-pass filter. This inductor/capacitor network provides an approximation of a wide bandwidth time delay which is accurate to 0.1% over a 25% bandwidth.

The above description applies to the receive beamformer associated with one of the two axes of a 2-axis array. It can be appreciated that a corresponding set of receive beamformer electrical hardware is utilized for processing the receive signals for the other axis.

Figure 13:
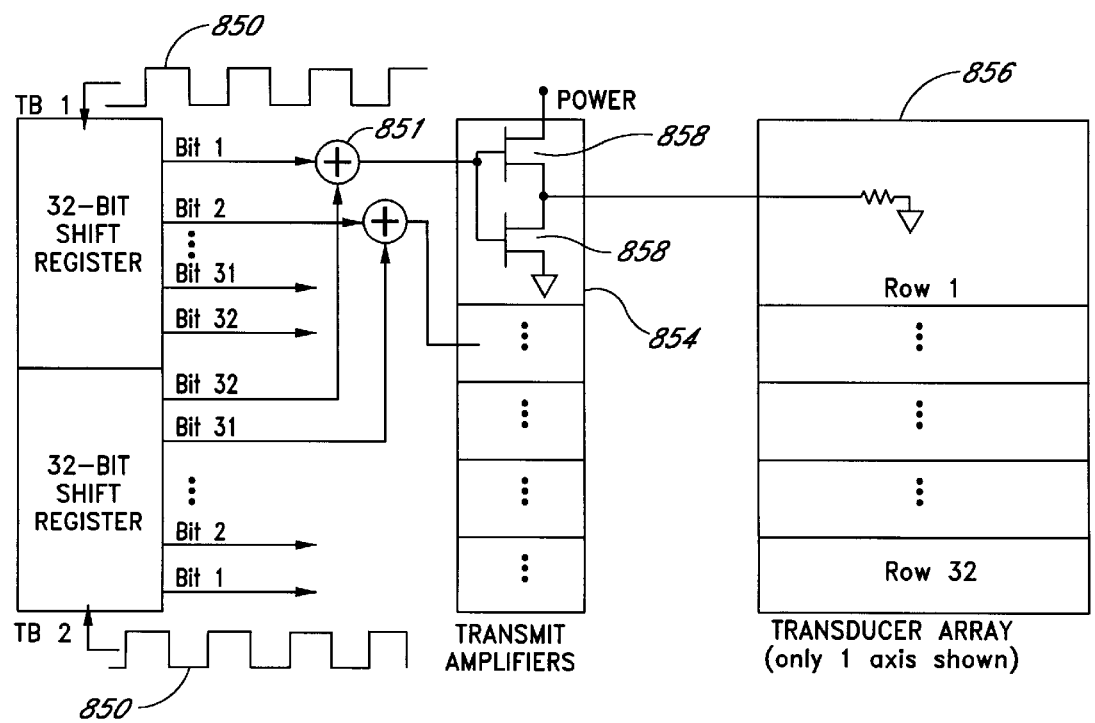
FIG. 13 is a schematic block diagram of one preferred embodiment of the time-delay transmit beamformer used in conjunction with the present invention.

FIG. 13 shows the preferred time-delay transmit beamformer (one axis only) associated with the present invention. The transmit beamformer time delays are achieved with digital circuits and square waveforms to simplify the circuits and achieve precise time delays determined by an accurate clock signal. TB1 and TB2 850 are square waveforms at the frequency to be transmitted by the four acoustic beams. For each of the 32 rows, TB1 and TB2 are summed together by summing circuits 851 after an appropriate time delay (achieved through use of 32 bit shift registers 852) and applied to the 32 array rows through the transmit amplifiers 854. Harmonics associated with the square wave output signals of the transmit amplifiers are attenuated by the bandpass characteristics of the transducer array row or column 856; the transmitted signal is therefore dominated by the fundamental transmit frequency. The transmit amplifiers are implemented with low impedance FET push/pull output stages 858 which have a low output impedance when driving the transducers. During receive mode operation, a high output impedance load is supplied by turning both push/pull stages off.

During the transmit mode, the electrical potential between the two faces of each ceramic element is determined by the summation of four appropriately delayed waveforms: the two row drive signals (TB1 and TB2) described above, and a corresponding set of time-delayed column drive signals (TB3 and TB4). Four inclined acoustic beams in 2 axes (X-Z and Y-Z planes) will be generated with these time delayed drive waveforms.

Figure 14:
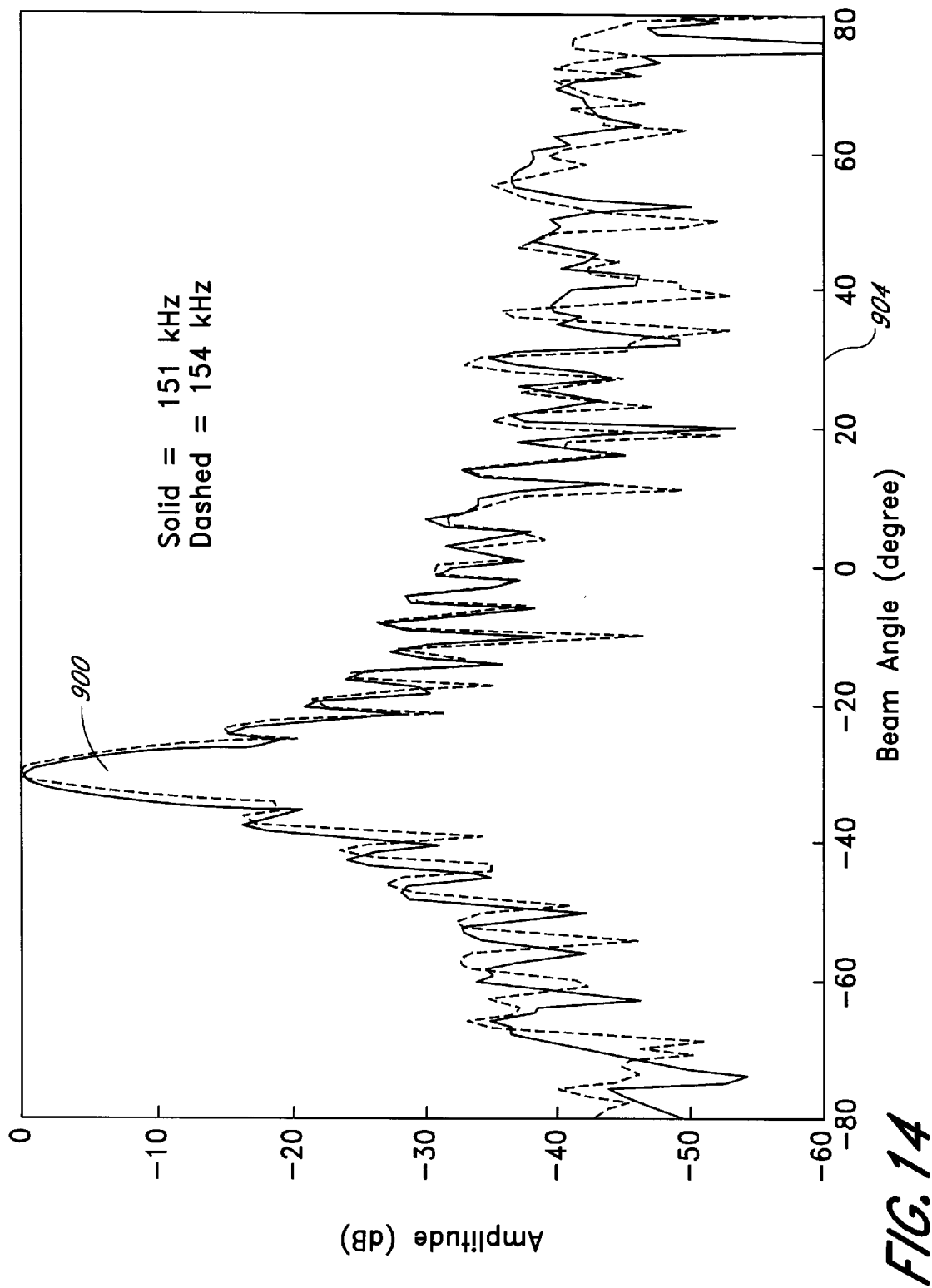
FIG. 14 is a graph of signal amplitude versus beam angle (measured from the Z-axis, normal to the array face) for a 150 kHz nominal 32×32 phased array transducer, as viewed in the X-Z or Y-Z planes, illustrating the formation of acoustic one beam.

The time delay array forms four transmit and receive beams each with a 4° beam width (based on two side, 3 dB downpoints). FIG. 14 is a graph of signal amplitude versus beam angle (measured from the Z-axis, normal to the array face) for a 150 kHz nominal 32×32 phased array transducer, as viewed in the X-Z or Y-Z planes, illustrating the formation of one acoustic beam 900. As shown, the sidelobe attenuation at the neighbor and opposite beam position (−+30 degree beam angle, 904) is about −40 dB.

3. Fabrication Description:

Another aspect of the present invention relates to a unique method of manufacturing a transducer array suitable for use in such a multiple beam sonar in an economical manner, and which preserves the precise geometrical relationships among the elements. This method is described in detail in the following paragraphs.

For high frequency arrays as previously described, the diameter of the individual transducer elements and the distance between the individual transducer elements is small, e.g., <5 mm, and a large number of precisely placed elements are required. Since it is not practical to assemble this many small individual elements into the array, the elements must remain in their original position during and after dicing, and must be electrically connected as previously described. Therefore, one cannot simply glue the ceramic element, fiberglass, acoustically transparent Flexible Printed Circuit (FPC), and backing material together and then cut it into the desired number of pieces. A reliable and economical method of manufacturing the 2-axis transducer array which preserves precise geometrical relationships among the elements is required.

Figure 15:
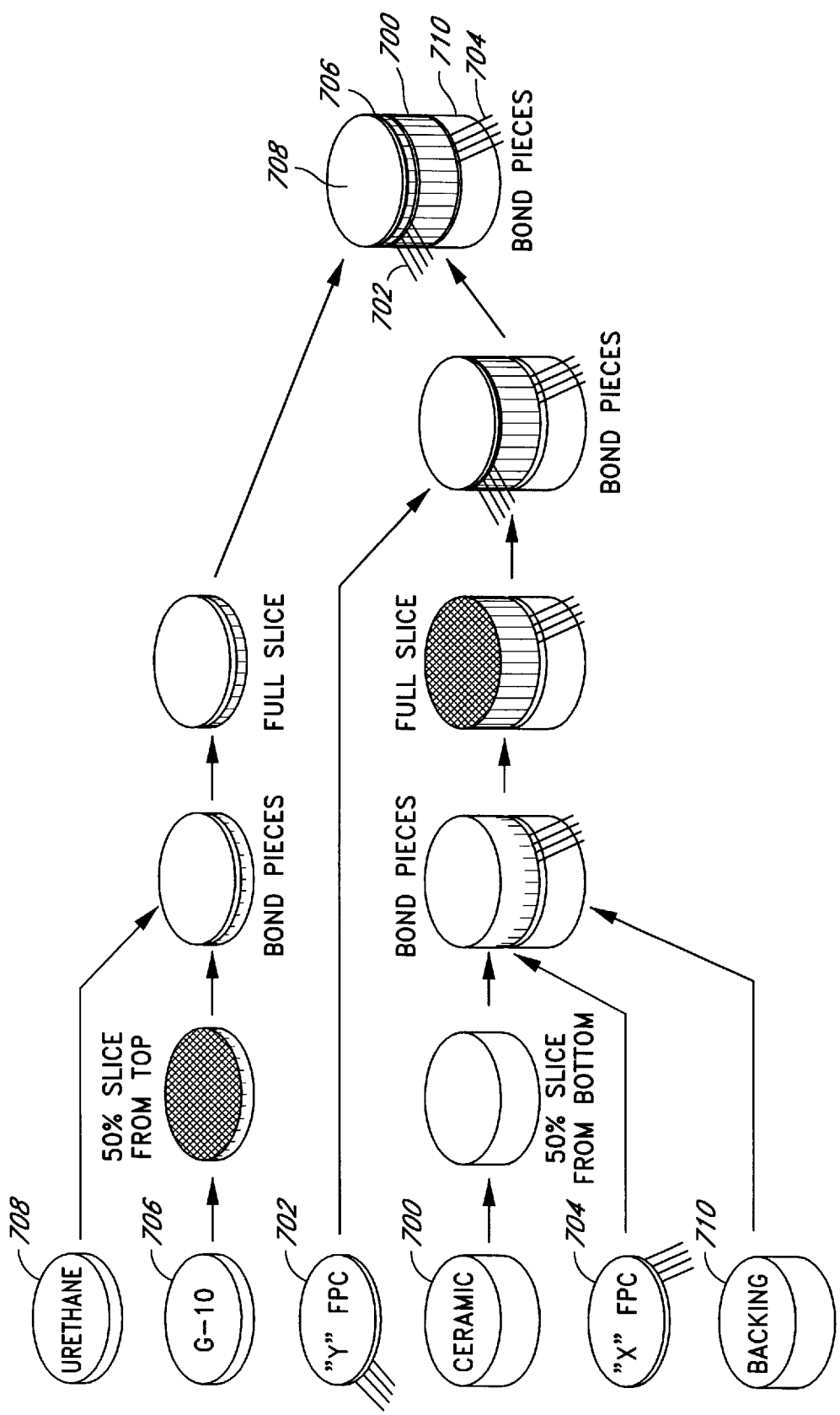
FIG. 15 is a process diagram illustrating the preferred manufacturing process for fabricating the preferred array transducer of the present invention.

The preferred process used to manufacture the preferred embodiment of the present invention is illustrated in FIG. 15. The necessary components for assembly of the preferred transducer array include a cylindrical solid fiberglass element 706 (G-10 or equivalent), front side (Y-axis) Y FPC sheets 702, a cylindrical ceramic element 700, back side (X-axis) X FPC sheets 704, a cardboard backing layer 710, and a urethane layer 708. A cup housing may also be utilized to house the transducer array assembly when the fabrication process is completed. Note that other forms such as ellipses or polygons which are generally symmetrical in the two face dimensions are also suitable for use in lieu of the aforementioned cylindrical shapes.

The fabrication process generally involves use of a parallel blade diamond saw to slice through the front and back sides of a solid piece of ceramic and an attached impedance layer to create electrically and mechanically independent elements. This is done in such a way that all array elements are held in place during and after slicing to preserve precise geometrical relationships among the elements. Specifically, the disclosed process for manufacturing the preferred embodiment of the present invention is as follows, with reference being made to FIG. 15:

1. First, a parallel blade diamond saw (not shown) is used to slice the front face of the fiberglass matching layer 706 halfway through its thickness, defined by the Z-axis, in the X and Y directions.

2. Second, a layer of acoustically transparent urethane 708 is bonded to the front face of the fiberglass matching layer 706.

3. The diamond saw is then used to slice the back side of the fiberglass matching layer 706 through its remaining thickness in both the X and Y directions.

4. Next, the diamond saw is used to slice the back face of the transducer array blank 700 halfway through its thickness, defined by the Z axis, in the X and Y directions.

5. A thin layer of X-axis conducting foil (X FPC) 704 is then bonded on the back face of the blank 700.

6. A layer of backing material 710 is next bonded to the back face of the X-FPC 704.

7. The front face of the blank 700 is next sliced through its remaining thickness (Z direction) in the X and Y directions.

8. A thin layer of Y-axis conducting foil (Y FPC) 702 is then bonded on the front face of the ceramic/X FPC transducer assembly.

9. Finally, the sliced fiberglass matching layer/urethane assembly 706, 708 and ceramic/FPC/backing assembly 700, 702, 704, 710 are bonded together as shown.

A cup housing or other support element may subsequently be fitted as required to provide for mounting the transducer array to the desired platform (such as a ship hull or current profiler) and sealing against water intrusion. It can be appreciated that a large number of different housing designs and sealing mechanisms may be utilized in conjunction with the present invention to fulfill these needs.

While the above detailed description has shown, described, and pointed out the fundamental novel features of the invention as applied to various embodiments, it will be understood that various omissions, substitutions, and changes in the form and details of the device or process illustrated may be made by those skilled in the art without departing from the spirit of the invention.

What is claimed is:

1. An acoustic system, comprising:
   a plurality of transducer elements arranged to form a single two-dimensional array, wherein the elements are electrically connected into rows in a first dimension and columns in a second dimension and the rows are electrically independent of the columns;
   a first beamforming circuit forming a first plane of acoustic beams projected outside of the array plane and substantially normal to the first transducer array dimension, the first beamforming circuit electrically connected to the transducer elements in the second transducer array dimension, wherein the first beamforming circuit delays signals associated, respectively, with each column; and
   a second beamforming circuit forming a first plane of acoustic beams projected outside of the array plane and substantially normal to the second transducer array dimension, the second beamforming circuit electrically connected to the transducer elements in the first array dimension, wherein the second beamforming circuit delays signals associated, respectively, with each row, the system thereby capable of forming at least two planes of acoustic beams.

2. The acoustic system of claim 1, wherein the acoustic beams formed by the system are in the Janus configuration.

3. The acoustic system of claim 1, wherein the transducer elements are arranged to substantially form a pattern selected from the group consisting of circular, elliptical or polygonal shapes.

4. The acoustic system of claim 1, wherein the rows and columns are orthogonal to one another.

5. The acoustic system of claim 1, wherein each transducer element has a facial crossection selected from the group consisting of a circular, elliptical or polygonal shapes.

6. The acoustic system of claim 1, wherein the transducer elements are arranged within the array such that the centerline-to-centerline distance between individual elements is one-half of the wavelength of the system acoustic carrier frequency as measured in water and at the front face of the array.

7. The acoustic system of claim 1, wherein the first and second beamforming circuits include multiple bit shift registers.

8. The acoustic system of claim 1, wherein each transducer element is symmetric in the facial plane.

9. The acoustic system of claim 1, wherein the first and second beamforming circuits provide a virtual ground load impedance to all rows and columns, respectively when the system is receiving signals.

10. The acoustic system of claim 1, wherein the first and second beamforming circuits provide a low source impedance to all rows and columns, respectively when the system is transmitting signals.

11. The acoustic system of claim 1, wherein the rows and columns of transducer elements are electrically connected into P sets of elements by interconnecting each Pth row and column, the first and second beamforming circuits being electrically connected to these P sets of rows and columns, respectively.

12. An electro-acoustic transducer capable of forming multiple transmit or receive acoustic beams from a single planar aperture, comprising:
   a plurality of transducer elements arranged in a planar array of N substantially parallel rows and M substantially parallel columns, each row of transducer elements being electrically connected along a first face of the array, and each column of transducer elements being electrically connected along a second face;
   a first transmit/receive beamformer electrically connected to the rows;
   a second transmit/receive beamformer electrically connected to the columns and operating in electrical independence of the first beamformer,
   a transmit/receive switch electrically connected, respectively, between the first and second beamformers and the rows and columns,
   wherein a transmit setting of the switch allows the first and second beamformers to apply signals to the rows and columns of transducer elements, respectively, to form the transmit beams, the signals being time- or phase-delayed, and,
   wherein a receive setting of the switch allows the first and second beamformers to receive signals from the row and column transducer elements, respectively, the signals from the rows and columns being, respectively, time- or phase-delayed and combined to form the receive beams.

13. The transducer of claim 12, wherein the acoustic beams formed by the system are in the Janus configuration.

14. The transducer of claim 12, wherein the transducer elements are arranged to substantially form a pattern selected from the group consisting of circular, elliptical or polygonal shapes.

15. The transducer of claim 12, wherein the rows and columns are orthogonal to one another.

16. The transducer of claim 12, wherein each transducer element has a facial crossection selected from the group consisting of a circular, elliptical or polygonal shapes.

17. The transducer of claim 12, wherein the transducer elements are arranged within the array such that the centerline-to-centerline distance between individual elements is one-half of the wavelength of the system acoustic carrier frequency as measured in water and at the front face of the array.

18. The transducer of claim 12, wherein the transmit/receive beamformer includes multiple bit shift registers.

19. The transducer of claim 12, wherein each transducer element is symmetric in the facial plane.

20. The transducer of claim 12, wherein the first and second transmit/receive beamformers provide a virtual ground load impedance to all rows and columns, respectively when the transmit/receive switch is positioned to receive signals.

21. The transducer of claim 12, wherein the first and second transmit/receive beamformers provide a low source impedance to all rows and columns, respectively when the transmit/receive switch is positioned to transmit signals.

22. The transducer of claim 12, wherein the rows and columns of transducer elements are electrically connected into P sets of elements by interconnecting each Pth row and column, the first and second transmit/receive beamformers being electrically connected to these P sets of rows and columns, respectively.

23. A method of forming multiple transmit or receive beams from a single planar array having a plurality of transducer elements arranged in N substantially parallel rows and M substantially parallel columns,
    wherein the planar array has a first transmit/receive beamformer electrically connected to the rows, a second transmit/receive beamformer electrically connected to the columns, and a transmit/receive switch electrically connected, respectively, between the first and second beamformers and the rows and columns, the method comprising the steps of:
    setting the transmit/receive switch to a transmit setting; and
    applying signals from the first and second beamformers to the rows and columns of transducer elements, respectively, to form transmit beams, the signals being time- or phase-delayed, or, alternatively,
    setting the transmit/receive switch to a receive setting; and
    allowing signals from the rows and columns of transducer elements to be applied to the first and second beamformers, respectively, with a time- or phase-delay, to form receive beams.

24. The method of claim 23, wherein the acoustic beams formed by the system are in the Janus configuration.

25. The method of claim 23, wherein the transducer elements are arranged to substantially form a pattern selected from the group consisting of circular, elliptical or polygonal shapes.

26. The method of claim 23, wherein the rows and columns are orthogonal to one another.

27. The method of claim 23, wherein each transducer element has a facial crossection selected from the group consisting of a circular, elliptical or polygonal shapes.

28. The method of claim 23, wherein the transducer elements are arranged within the array such that the centerline-to-centerline distance between individual elements is one-half of the wavelength of the system acoustic carrier frequency as measured in water and at the front face of the array.

29. The method of claim 23, wherein the transmit/receive beamformer includes multiple bit shift registers.

30. The method of claim 23, wherein each transducer element is symmetric in the facial plane.

31. The method of claim 23, wherein the first and second transmit/receive beamformers provide a virtual ground load impedance to all rows and columns, respectively when the transmit/receive switch is positioned to receive signals.

32. The method of claim 23, wherein the first and second transmit/receive beamformers provide a low source impedance to all rows and columns, respectively when the transmit/receive switch is positioned to transmit signals.

33. The method of claim 23, wherein the rows and columns of transducer elements are electrically connected into P sets of elements by interconnecting each Pth row and column, the first and second transmit/receive beamformers being electrically connected to these P sets of rows and columns, respectively.

34. The method of claim 23, wherein the rows and columns of the planar array simultaneously form either transmit or receive beams in two planes.

35. An electro-acoustic transducer capable of simultaneously forming multiple transmit or receive acoustic beams in first and second orthogonal planes and from a single planar aperture, comprising:
    a plurality of transducer elements arranged in a planar array of N substantially parallel rows and M substantially parallel columns, each row of transducer elements being electrically connected along a first face of the array, and each column of transducer elements being electrically connected along a second face;
    a first transmit/receive beamformer electrically connected to the rows;
    a second transmit/receive beamformer electrically connected to the columns and operating in electrical independence of the first beamformer,
    a transmit/receive switch electrically connected, respectively, between the first and second beamformers and the rows and columns,
    wherein a transmit setting of the switch allows the first and second beamformers to apply signals to the rows and columns of transducer elements, respectively, to form multiple transmit beams within the first and second orthogonal planes, respectively, the beams being at the same angle of inclination relative to a direction normal to the to first and second faces of the planar array, the signals being time- or phase-delayed, and,
    wherein a receive setting of the switch allows the first and second beamformers to receive signals from the row and column transducer elements, respectively, the signals from the rows and columns being, respectively, time- or phase-delayed and combined to form receive beams oriented within the first and second orthogonal planes, the beams being at the same angle of inclination relative to a direction normal to the first and second faces of the planar array.

36. An electro-acoustic system capable of simultaneously transmitting or receiving multiple acoustic beams in a fluid medium, comprising:
    a plurality of transducer elements arranged to form a single two-dimensional array wherein the elements are electrically connected on a first array face in N rows in a first direction, and on a second array face in M columns in a second direction, the connection on the first and second faces being electrically independent;
    a first transmit/receive beamformer electrically interfaced to the N rows, wherein signals applied to or received from the rows are electrically independent of signals simultaneously applied to or received from the columns;
    a means for operating the first transmit/receive beamformer in a transmit mode, wherein the first beamformer generates a set of N electrical signals, each signal being time- or phase-delayed, and applies each electrical signal to its respective transducer row element, thereby forming a set of multiple transmit acoustic beams inclined outward from a direction normal to the first and second faces, and positioned within a plane oriented normal to the first direction;

a means for operating the first transmit/receive beamformer in a receive mode wherein the first beamformer receives a set of electrical signals corresponding to each of the N rows and applies a time or phase delay to each signal, the resulting time- or phase-delayed signals from each row being combined together to form a set of multiple receive acoustic beams inclined outward from a direction normal to the first and second faces, and positioned within a plane oriented normal to the first direction;

a means for operating the second transmit/receive beamformer in a transmit mode, wherein the second beamformer generates a set of M electrical signals, each signal being time- or phase-delayed, and applies each electrical signal to its respective transducer column element, thereby forming a set of multiple transmit acoustic beams inclined outward from a direction normal to the first and second faces, and positioned within a plane oriented normal to the second direction; and a means for operating the second transmit/receive beamformer in a receive mode wherein the second beamformer receives a set of electrical signals corresponding to each of the M columns and applies a time or phase delay to each signal, the resulting time- or phase-delayed signals being combined together to form a set of multiple receive acoustic beams inclined outward from a direction normal to the first and second faces, and positioned within a plane oriented normal to the second direction.

\* \* \* \* \*

UNITED STATES PATENT AND TRADEMARK OFFICE
CERTIFICATE OF CORRECTION

PATENT NO.   : 5,808,967
DATED        : September 15, 1998
INVENTOR(S)  : Yu, Xiaolong, Bradley, Steven E. and Rowe, Francis D.

It is certified that error appears in the above-identified patent and that said Letters Patent is hereby corrected as shown below:

Column 1,
Line 3, before "BACKGROUND OF THE INVENTION" please add the following paragraph and heading
                    -- GOVERNMENTAL RIGHTS
      This invention was made with Government support under Contract Number N00014-95-C-0407 awarded by The Office of Naval Research. The Government has certain rights in this invention." --

Signed and Sealed this

Fourth Day of February, 2003

JAMES E. ROGAN
*Director of the United States Patent and Trademark Office*